(12) United States Patent
Trnkus et al.

(10) Patent No.: US 9,491,086 B2
(45) Date of Patent: Nov. 8, 2016

(54) DISTRIBUTED NETWORK PLANNING SYSTEMS AND METHODS

(75) Inventors: Marian Trnkus, Chevy Chase, MD (US); Loudon Blair, Severna Park, MD (US)

(73) Assignee: Ciena Corporation, Hanover, MD (US)

(\*) Notice: Subject to any disclaimer, the term of this patent is extended or adjusted under 35 U.S.C. 154(b) by 957 days.

(21) Appl. No.: 13/242,112

(22) Filed: Sep. 23, 2011

(65) Prior Publication Data

US 2012/0226824 A1      Sep. 6, 2012

Related U.S. Application Data

(60) Provisional application No. 61/448,494, filed on Mar. 2, 2011.

(51) Int. Cl.
| | |
|---|---|
| *H04L 12/751* | (2013.01) |
| *H04L 12/707* | (2013.01) |
| *H04L 12/24* | (2006.01) |
| *H04L 12/729* | (2013.01) |
| *H04W 16/18* | (2009.01) |
| *H04W 92/02* | (2009.01) |

(52) U.S. Cl.
CPC ............ *H04L 45/02* (2013.01); *H04L 41/12* (2013.01); *H04L 45/125* (2013.01); *H04L 45/22* (2013.01); *H04W 16/18* (2013.01); *H04W 92/02* (2013.01)

(58) Field of Classification Search
CPC .... H04W 16/18; H04W 16/92; H04L 45/00; H04L 45/02; H04L 45/22; H04L 45/42; H04L 45/60; H04L 45/125; H04L 41/12; H04L 41/0836; H04L 41/0677

USPC ........................................................ 709/250
See application file for complete search history.

(56) References Cited

U.S. PATENT DOCUMENTS

| | | | |
|---|---|---|---|
| 6,141,125 A | 10/2000 | Blair et al. | |
| 7,606,494 B1 | 10/2009 | Weston-Dawkes et al. | |
| 7,826,448 B2 * | 11/2010 | Berde et al. ................. | 370/389 |

(Continued)

OTHER PUBLICATIONS (Title: AntNet: Distributed Stigmergetic Control for Communications network; Journal of Artificial Intelligence Research 9,; 1998, by Caro et al).*

(Continued)

*Primary Examiner* — Ramy M Osman
(74) *Attorney, Agent, or Firm* — Clements Bernard PLLC; Christopher L. Bernard; Lawrence A. Baratta, Jr.

(57) ABSTRACT

The present disclosure provides distributed domain network planning systems and methods. The network planning systems and methods include a distributed domain network planning system that adapts planning concepts to networks operated by modern distributed control planes, such as ASON/ASTN, GMPLS, etc. The network planning systems and methods operate on a multi-domain network utilizing a control plane and local planning systems associated with each individual domain in the multi-domain network. The network planning systems and methods also operate on a single domain network utilizing a control plane and local planning systems associated with the single domain network. The network planning systems and methods build on a distributed control plane philosophy that the network is the database of record. There is significant operational value to distributing the planning function of a large network using the systems and methods disclosed herein.

18 Claims, 18 Drawing Sheets

(56) References Cited

U.S. PATENT DOCUMENTS

| | | | |
|---|---|---|---|
| 7,831,700 B2 | 11/2010 | Lee | |
| 7,978,622 B2 | 7/2011 | Zhang | |
| 8,072,900 B2* | 12/2011 | Antal | H04L 45/02 370/252 |
| 8,082,335 B2* | 12/2011 | Mishra et al. | 709/223 |
| 8,254,272 B1* | 8/2012 | Vasseur | H04L 41/0677 370/236.2 |
| 8,456,984 B2* | 6/2013 | Ranganathan et al. | 370/228 |
| 8,503,305 B2* | 8/2013 | Porat et al. | 370/236 |
| 9,007,916 B2* | 4/2015 | Maggiari | 370/236 |
| 2006/0072505 A1* | 4/2006 | Carrillo | H04L 41/042 370/331 |
| 2008/0049751 A1* | 2/2008 | Venkat et al. | 370/392 |
| 2008/0089346 A1 | 4/2008 | Lee | |
| 2008/0101242 A1* | 5/2008 | Sadler et al. | 370/238 |
| 2009/0257746 A1 | 10/2009 | Reina et al. | |
| 2009/0304010 A1 | 12/2009 | Kurebayashi et al. | |
| 2010/0054731 A1 | 3/2010 | Oltman et al. | |
| 2010/0061301 A1* | 3/2010 | Antal | H04L 45/00 370/328 |
| 2010/0142943 A1 | 6/2010 | Frankel et al. | |
| 2010/0202773 A1 | 8/2010 | Lee et al. | |
| 2010/0220739 A1 | 9/2010 | Ishiguro | |
| 2010/0220995 A1 | 9/2010 | Lee et al. | |
| 2010/0220996 A1 | 9/2010 | Lee et al. | |
| 2011/0022728 A1 | 1/2011 | Kern et al. | |
| 2013/0100817 A1* | 4/2013 | Oltman | H04L 45/125 370/238 |
| 2013/0114409 A1* | 5/2013 | Iovanna | H04L 45/02 370/235 |
| 2013/0135992 A1* | 5/2013 | Callejo Rodriguez | H04L 41/0836 370/228 |
| 2014/0098710 A1* | 4/2014 | Ong | H04L 45/42 370/255 |

OTHER PUBLICATIONS (Title: Using Partial Global Plans to Coordinate Distributed Problem Solvers; by Durfee et al) Published in: • Proceeding ; IJCAI'87 Proceedings of the 10th international joint conference on Artificial intelligence—vol. 2; pp. 875-883.*

(Title: Deployment of the GMPLS Control Plane for Grid Applications in Experimental High-Performance Networks; IEEE communications magazine; Mar. 2006; by Habib et al).*

* cited by examiner

DISTRIBUTED NETWORK PLANNING SYSTEMS AND METHODS

CROSS-REFERENCE TO RELATED APPLICATION(S)

The present non-provisional patent application/patent claims the benefit of priority of U.S. Provisional Patent Application No. 61/448,494, filed on Mar. 2, 2011, and entitled "DISTRIBUTED MULTI-DOMAIN NETWORK PLANNING SYSTEMS AND METHODS," the contents of which are incorporated in full by reference herein.

FIELD OF THE INVENTION

The present disclosure relates generally to networking and network management/planning systems and methods. More particularly, the present disclosure relates to distributed single or multi-domain network planning systems and methods whereby the network planning is synchronized with a distributed control plane such as with International Telecommunication Union ITU-T Automatically Switched Optical/Transport Networks (ASON/ASTN), Internet Engineering Task Force (IETF) Generalized Multi-Protocol Label Switching (GMPLS), Optical Internetworking Forum (OIF) Implementation Agreements, Tele-Management Forum (TMF) models for the management plane, Optical Signaling and Routing Protocol (OSRP), and the like.

BACKGROUND OF THE INVENTION

Network operators may use equipment from one or more vendors to provide functionality at various network layers. Each vendor may provide a planning system to automate planning of additional equipment in the network based on set of new services (demands). Networks may be operated in single or multi-domain configurations. In a single domain environment, typically a single instance of a planning system is used per vendor. In a multi-domain environment, there is typically an instance of the planning system per domain and vendor. Some planning systems support an inventory discovery feature, allowing the planning system to automatically update its internal data model from the deployed network. Planning multi-domain networks requires coordination of network designs across multiple instances of planning systems, and often multiple vendors. This makes a network-wide design of services in a multi-domain configuration inherently much more complicated. Often, a user has to manually operate multiple systems and transfer data from one system to another. The user also has to evaluate the output of planning systems, correlate results and select an optimal solution. This makes the planning process slow, labor intensive and prone to errors.

Some network operators may use a "super" planning system, custom built to enable planning services across domains/vendors. Building a "super" planning tool requires a considerable amount of resources. Even when in operation, the system may require a lot of manual updates of network information, and hence is prone to similar issues as mentioned above. The network topology collection process is typically implemented by collection via an Element Management System (EMS) to Network Element (NE) interface. This interface, typically implemented in Transaction Language-1 (TL-1), Common Object Request Broker Architecture (CORBA), Extensible Mark-up Language (XML), or other custom protocols, is usually slow and not optimized for large data transfers. These interfaces may also be proprietary, limiting visibility to a single vendor domain. Also, network topology data available to each planning system typically contains only topology of a single domain.

BRIEF SUMMARY OF THE INVENTION

In various exemplary embodiments, the present disclosure provides distributed network planning systems and methods. That is, the network planning systems and methods include a distributed network planning system that adapts planning concepts to networks operated by modern distributed control planes, such as ASON/ASTN, GMPLS, etc. The network planning systems and methods operate on a network utilizing a control plane and multiple planning systems associated with individual vendor or administrative functions. Often, networks are partitioned into domains to organize administrative functions by geography, technology, vendor, etc. Multi-domain networks are covered by the network planning systems and methods as well as single domain networks. The network planning systems and methods build on a distributed control plane philosophy that the network is the database of record. Advantageously, there is significant operational value to distributing the planning function of a large network using the network planning systems and methods disclosed herein. In the same way that a distributed control plane can directly reduce the operating expenses ("OPEX") associated with provisioning, a network operator may significantly reduce time, resources and operational expenditure used for end-to-end planning.

In an exemplary embodiment, a network includes a plurality of interconnected network elements; a distributed control plane configured to operate therebetween the plurality of interconnected network elements; and at least one planning system communicatively coupled to the distributed control plane via a signaling communication network, wherein the at least one planning system is configured to receive and process messages from the distributed control plane through the signaling communication network. Optionally, the plurality of interconnected network elements are partitioned into multiple domains. Alternatively, the plurality of interconnected network elements are organized in a single domain. The network may further include a path computation element associated with the plurality of interconnected network elements, wherein the global signaling communication network connects at least one planning system to the path computation element. The network may further include a plurality of additional path computation elements associated with the plurality of interconnected network elements, wherein one of the path computation elements and the plurality of additional path computation elements include a designated router for purposes of optimized data exchange on the signaling communication network. Alternatively, the plurality of interconnected network elements may be communicatively coupled directly to the at least one planning system via the signaling communication network. The network may further include a designated router including one of the plurality of interconnected network elements, wherein the designated router is communicatively coupled directly to the at least one planning system via the signaling communication network. At least one planning system is configured to: synchronize a local database based on processed messages; and perform network planning functions utilizing the synchronized local database. The network may further include a second local planning system, and wherein the at least one planning system is further configured to: communicate with the second local planning system via the signaling communication network;

and make reservation requests with the second local planning system. At least one planning system may be further configured to communicate via the signaling network to make reservation requests over the distributed control plane to plurality of interconnected planning systems. At least one planning system may be further configured to send explicit route objects or designated transit lists over the distributed control plane through the global signaling communication network to the plurality of interconnected network elements.

In another exemplary embodiment, a planning system includes a network interface communicatively coupled to a signaling communication network; and a processor communicatively coupled to the network interface, wherein the processor is configured to: receive messages from a distributed control plane associated with a plurality of interconnected network elements over the signaling communication network; and perform updates to a local database based on the messages. The processor may be further configured to perform network planning functions utilizing the local database. The processor may be further configured to communicate with a second planning system via the signaling communication network; and make reservation requests with the second planning system. The processor may be configured to communicate via the signaling communication network with the plurality of path computation elements. The processor may be further configured to send reserved topology and routing viability updates to the distributed control plane via the signaling communication network.

In yet another exemplary embodiment, a method includes operating a plurality of interconnected network elements with a distributed control plane therebetween; signaling control plane messages from the distributed control plane to at least one local network planning system; and synchronizing a local database of the at least one local network planning system responsive to received control plane messages. The method may further include performing network planning via the at least one local network planning system; and based on the network planning, sending a reservation request. The reservation request may be sent to any of another local network planning system, a network management system, a path computation element, a designated router, and one or more of the plurality of interconnected network elements. The method may further include partitioning the plurality of network elements into a plurality of domains; interconnecting the distributed control plane from each of the plurality of domains via a signaling communication network; and communicating all of the plurality of domains to the at least one local network planning system via the signaling communication network.

BRIEF DESCRIPTION OF THE DRAWINGS

Exemplary and non-limiting embodiments of the present invention are illustrated and described herein with reference to the various drawings, in which like reference numbers denote like method steps and/or system components, respectively, and in which.

DETAILED DESCRIPTION OF THE INVENTION

Figure 1:
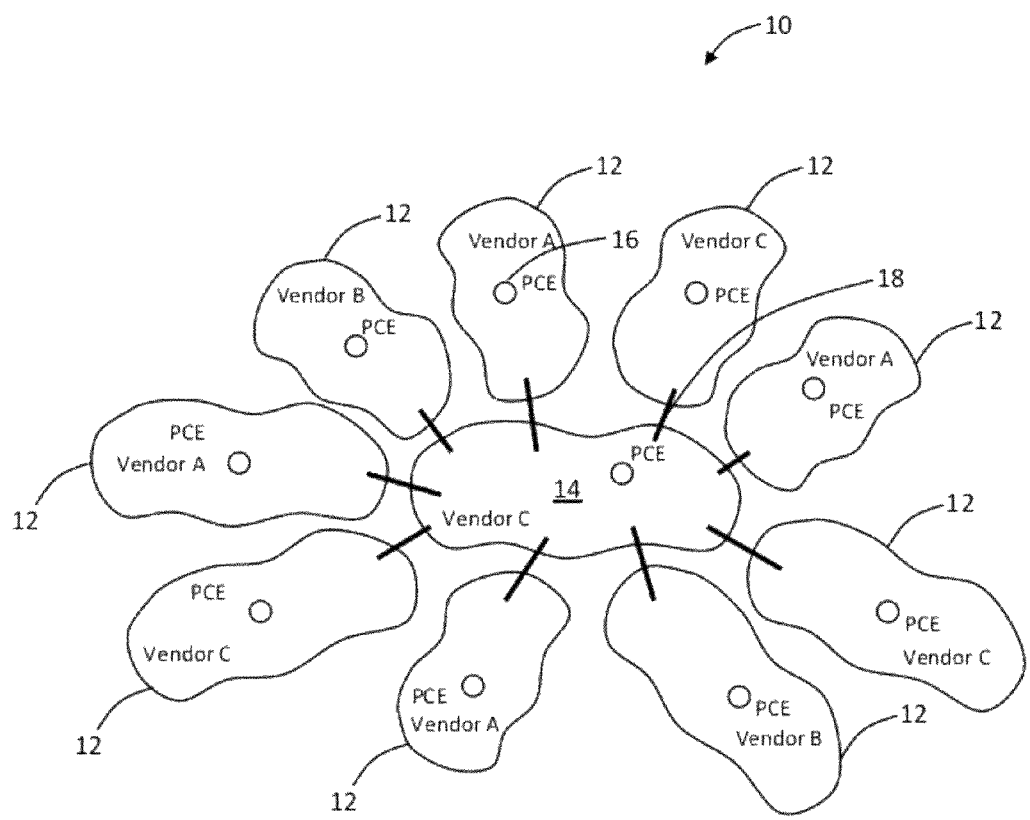
FIG. 1 is a network diagram of a multi-domain control architecture.

In various exemplary embodiments, the present disclosure provides distributed network planning systems and methods. That is, the network planning systems and methods include a distributed network planning system that adapts planning concepts to networks operated by modern distributed control planes, such as ASON/ASTN, GMPLS, etc. In an exemplary embodiment, the network planning systems and methods operate on a multi-domain network utilizing a control plane and local planning systems associated with each individual domain in the multi-domain network. In another exemplary embodiment, network planning systems and methods operates on a single domain network utilizing a control plane with multiple planning systems. The network planning systems and methods build on a distributed control plane philosophy that the network is the database of record with integration between the distributed control plane and various network planning systems and methods. Advantageously, there is significant operational value to distributing the planning function of a large network using the network planning systems and methods disclosed herein. In the same way that a distributed control plane can directly reduce the operational complexity and operating expenses ("OPEX") associated with service provisioning, a network operator may significantly reduce time, resources and operational expenditure used for end-to-end planning.

Network planning systems and methods are used variously for communication networks including, for example, optical, data, telephony, wireless, cable (MSO), and the like. Network planning systems and methods are typically implemented by a server or equivalent with software configured to model actual network deployments. Through such models, network operators are able to better plan and forecast network growth and evolution. Network planning and design may be an iterative process, encompassing topological design, network-synthesis, and network-realization, and is aimed at ensuring that a new network or service meets the needs of the operator and associated subscribers. For example, a network planning methodology may involve various layers of planning, namely business planning, long-term and medium-term network planning, short-term network planning, IT asset sourcing, operations and maintenance, etc. In an exemplary aspect, the network planning systems and methods integrate network planning with existing network elements via distributed control planes thereby keeping the network planning system up to date via control plane messages.

Control plane implementations provide automated setup and control of services in a network. A control plane may include software, processes, algorithms, etc. that control configurable features of the network, such as automating discovery of network elements, capacity on the links, port availability on the network elements, connectivity between ports; dissemination of topology and bandwidth information between the network elements; calculation and creation of paths for connections; network level protection and restoration; and the like. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, service restoration and the like. Control planes allow a user to specify the start point, end point, and bandwidth required, and an agent on the Network Elements allocates a path through the network, provisioning the traffic path, setting up cross-connects, and allocating bandwidth from the paths for the user requested service. The actual path that the traffic will take through the network may not be specified by the user, but rather computed on demand by algorithms.

Several control plane standards exist including International Telecommunication Union ITU-T Automatically Switched Optical/Transport Network (ASON/ASTN), Internet Engineering Task Force (IETF) Generalized Multi-Protocol Label Switching (GMPLS), Optical Signaling and Routing Protocol (OSRP) available from Ciena Corporation (OSRP is an optical routing protocol similar to PNNI (Private Network-to-Network Interface) and MPLS), Optical Internetworking Forum (OIF) Implementation Agreements, Tele-Management Forum (TMF) models for the management plane, and the like. ASON specifications generally define an optical control plane communication framework, including signaling, routing, and discovery protocols and management aspects of distributed control plane. GMPLS defines control plane discovery, routing, and signaling protocols. OIF Implementation Agreements define protocol extensions for multi-vendor interoperability. One such OIF Implementation Agreement is the External Network-Network Interface (ENNI) OSPF-based (Open Shortest Path First) Routing 1.0 Intra-Carrier Implementation Agreement, OIF-ENNI-OSPF-01.0, January 2007. To scale control planes or to connect multiple domains, typically an ENNI is utilized to interconnect Internal-Network to Network Interface (INNI) domains together.

The network planning systems and methods described herein, using a distributed control plane, leverage each network element and the concept of synchronization of distributed databases (routing) to give visibility of network wide topology to all network elements, path computation elements and planning systems. That is, the network planning systems and methods provide synchronization of multiple network planning system databases by incorporating the network planning systems into the control plane through a signaling communications network (SCN). The network information that is synchronized via the distributed control plane contains both existing and planned network data. The planned network data may contain detail reservations of network bandwidth for specific network services, thereby allowing operator to reserve bandwidth for future services in timed fashion. For example, the network planning systems may be configured to monitor control plane updates, e.g. link state advertisements (LSAs), etc., that are flooded via the control plane between network elements. Under the distributed control plane philosophy that the network is the database of record, each network element and each network planning system will have a consistent database based on the monitoring of the control plane. This enables each network element within a common Internal-Network to Network Interface (I-NNI) domain to make network wide path computation decisions independently of each other. Network elements then use signaling to establish network-wide service connectivity. Such networks face scaling limitations when the number of network elements and associated links becomes too large. To scale large network configurations, a network is typically configured into multiple administrative domains (e.g. ITU-T's ASON model). Note administrative domains maybe partitioned for various reasons including scaling, network monitoring, regulatory, etc. With respect to scaling, networks starts getting large with a few hundred to thousand network elements depending on complexity of control communications. Since each network element does not typically have visibility outside of its domain, different methods have been proposed to enable path computation across multiple domains. The use of routing topology abstraction across an External Network-to-Network Interface (E-NNI) interface is one method that is proposed. Another approach undergoing significant study in the industry (e.g. in the IETF) is to use a Path Computation Element (PCE) or sequence of PCEs to compute the end-to-end path across multiple networks. Traditionally the PCE computes path to be used in existing network. Part of the network planning systems and methods provides information about future planned services to the PCE to reserve bandwidth for use of new services at a precise future time.

In various exemplary embodiments, the present disclosure includes a combination of network planning systems and methods, distributed control plane signaling and routing, and a global signaling communication network interconnecting the network planning systems and methods with the distributed control plane signaling and routing. In an exemplary embodiment, the network planning systems and methods include a listen only configuration whereby the network planning systems and methods listen to the global signaling communication network for topology data and updates for local use by the network planning systems and methods. In another exemplary embodiment, the network planning systems and methods include a first listen and talk configuration whereby the network planning systems and methods listen to the global signaling communication network for topology data and then reserves resources with other planning systems. In yet another exemplary embodiment, the network planning systems and methods include a second listen and talk configuration whereby the network planning systems and methods listen to the global signaling communication network for topology data and then reserve resources globally and advertises reserved resources via the distributed control plane. Note, to reserve resources globally may include bandwidth reservation is done between planning systems in multiple domains. For example, the network planning systems and methods may calculate routes (e.g., via Designated Transit Lists, Explicit Route Objects, etc.) and populate forwarding tables on a Path Computation Element (PCE) or network elements for later use by a distributed control plane.

Referring to FIG. 1, in an exemplary embodiment, a multi-domain control architecture is illustrated in a network 10. Specifically, the network 10 includes various domains 12, 14 with a Path Computation Element (PCE) 16 in each of the domains 12, 14. In this exemplary embodiment, the domains 12 are each interconnected to the domain 14 via E-NNI links 18. E-NNI is a protocol defined by the ITU and extended through Optical Internetworking Forum (OIF) Implementation Agreements. Within each of the domains 12, 14, signaling and routing is performed by Internal-Network to Network Interface (I-NNI) links. For example, the domain 14 may be a core domain whereas the domains 12 may be metro domains or domains belonging to a different network operator. Those of ordinary skill in the art will recognize that the domains 12 may also interconnect therebetween using E-NNI links 18 (not shown). The PCE 16 is defined by the Internet Engineering Task Force (IETF) in RFC 4655 as an entity (component, application, or network node) that is capable of computing a network path or route based on a network graph and applying computational constraints. The PCE 16 in each of the domains 12, 14 populate their data from local I-NNI advertisements within the domains 12, 14, and the PCEs 16 are used for external (i.e. outside of the local domain) connection requests. The network 10 may use various PCE 16 configurations. For example, the PCE 16 understands local domain topology and knows how to contact PCEs 16 in the other domains 12, 14. If the PCE 16 needs to compute a path across domains 12, 14, it contacts it neighbors to compute segments within their local domains and compose a complete end to end path from segments provided by PCE in each domain.

Figure 2:
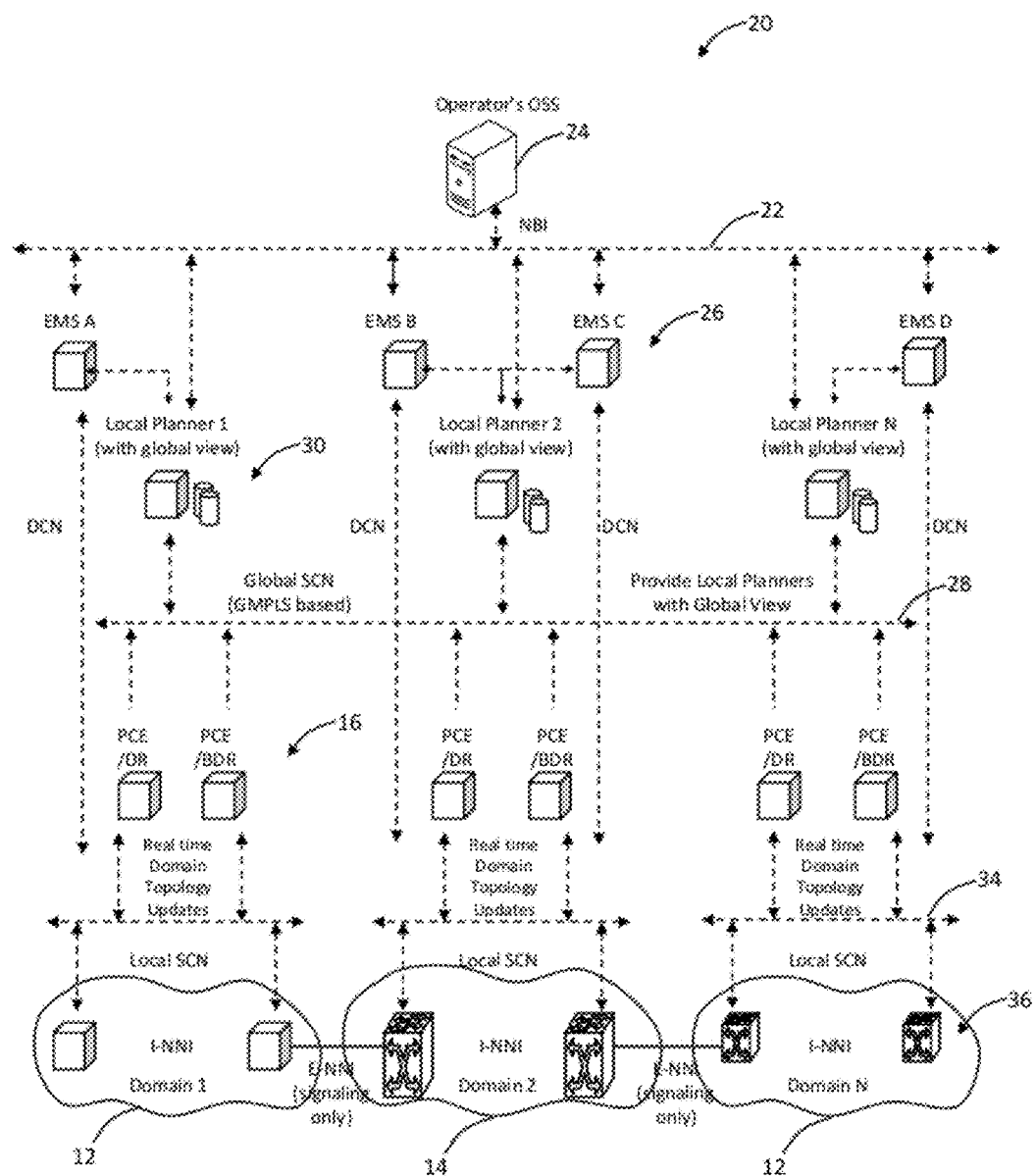
FIG. 2 is a hierarchical diagram of a network architecture for the network of FIG. 1 using the Path Computation Elements (PCEs) to maintain real-time topologies in their respective domains.

Referring to FIG. 2, in an exemplary embodiment, a network architecture 20 is illustrated for the network 10 of FIG. 1 using the PCEs in conjunction with DR/BDR 16 to maintain real-time topologies in their respective domains. Note, the PCEs 16 need not be used to maintain real time topologies for domains in context of single domain. The network architecture 20 includes various communication layers between elements in the network 10 including a network 22 link between an operator's Operational Support System (OSS) 24 (or Network Management System (NMS)) and various Element Management Systems (EMS) 26. The network architecture 20 further includes a global signaling communication network (SCN) 28 communicatively coupling local network planning systems 30 and PCEs 16. The PCEs 16 may also include Designated Routers (DR) and Backup DRs (BDR). The network architecture 20 further includes a local SCN 34 for each domain 12, 14 that communicatively couples the PCEs 16 and network elements 36. The network elements 36 may be an optical switch, a cross-connect, an Ethernet switch, a router, a multi-service provisioning platform (MSPP), a dense wave division multiplexed (DWDM) platform, an Optical Transport Network (OTN) switch, a Synchronous Optical Network (SONET) multiplexer, a Synchronous Digital Hierarchy (SDH) multiplexer, or combinations thereof. In an exemplary embodiment, the network elements 36 may include a switch which consolidates various transport, switching, bridging or routing functions into a single, high-capacity intelligent switching system providing multi-layer consolidation.

Topology information is collected by each of the local planning systems 30 by listening to topology advertisements from each of the domains 12, 14 across the global SCN 28. For example, Open Shortest Path First (OSPF) or Intermediate System Intermediate System (ISIS) may be used to synchronize databases for the planning systems 30. These advertisements may be provided by a single network element 36 or the path computation elements 16 either alone or in conjunction with DR/BDR, and multicast to the planning systems 30 that are listening on the global SCN 28. This method of collecting and storing topology advertisements is a more efficient way to collect topology data than traditional top-down EMS-driven (e.g. polling) approaches, and hence enables efficient sharing this data across the multiple planning systems 30. Each of the planning systems 30 now has visibility to the entire network topology, and is capable of computing any path for any service across the multiple domains 12, 14. In an exemplary embodiment, the end to end global SCN 28 enables control communications between each of the local planning systems 30. PCEs/DRs 16 associated with each of the domains 12, 14 are also attached to this SCN 28. Each of the PCEs 16, DR, BDR, in the network 10 advertises routing updates associated with its local topology on to the global SCN 28. The local planning systems 30 then listen to this advertised data and synchronize their databases with the routing updates.

FIGS. 1 and 2 illustrate a first exemplary embodiment of the network planning systems and methods whereby the PCEs 16 maintain local views of their topologies and communicate therebetween for external domain connection requests. In this first exemplary embodiment, the local planning systems 30 are communicatively coupled to the entire network 10 via the global SCN 28 and thus have a global view of the network 10 by listening to routing updates from all of the PCEs 16 on the SCN 28. Further, the local planning systems 30 may signal connection reservations therebetween on the SCN 28. The PCEs 16, either alone or in conjunction with DR/BDR function, also communicate globally across the SCN 28, but each of the PCEs 16 only stores and maintains its local topology.

In an exemplary embodiment, the planning tool may consolidate function of a PCE, while keeping communications on global SCN 28 and local SCN 34 separate. For example, such configuration may be utilized in lieu of the PCEs 16, i.e. where the local planning systems 30 provides PCE function to the network elements 36 directly. Various exemplary embodiments described herein refer to the PCE 16, and as described above, a PCE is defined in IETF RFC 4655. The PCE is an entity capable of computing complex paths for a single or set of services. A PCE might be integrated within a network element, integrated within a network management system (NMS), as a dedicated computational platform, and in combinations thereof in a hierarchical fashion which is aware of the network resources and has the ability to consider multiple constraints for sophisticated path computation. PCE applications include computing Label Switched Paths for MPLS and GMPLS Traffic Engineering. Those of ordinary skill in the art will recognize that a PCE is not essential in all embodiments of the network planning systems and methods. That is, the network planning systems and methods contemplate the ability of the network to advertise topology information to the planning system with the PCE 16 representing an exemplary embodiment, i.e. the PCE as the intermediate sub-system that either directly, or via DR/BRD component, forwards topology information to the planner. However, the planner could easily listen directly to topology advertisements coming from control plane enabled network elements.

Other exemplary embodiments described herein refer to Designated Routers (DR) and Backup DRs (BDR). DR and BDR are defined in RFC 1583 OSPF Version 2. Generally, the DR is a router interface elected among all routers on a particular multi access network segment, generally assumed to be broadcast multi access. As an improvement, the concept of a Designated Router (DR) was originally introduced to Link State Routing protocols to reduce the full mesh of control messaging which is otherwise required when multiple routers are connected using an Ethernet LAN segment. For example, the routers attached to the LAN segment determine which of them is best qualified to be the DR, and then all the others form a control adjacency with that DR (and may be a backup DR) and no other routers. In this way, the number of control messages to support routing over the LAN segment is O(N) for N routers, rather than $O(N^2)/2$. Similar to the PCE, the DR and BDR may be used in an exemplary embodiment as an intermediate sub-system that forwards topology information to the planner in some exemplary embodiments. Alternatively, the DR and BDR may be formed as part of the PCE exemplary embodiments.

As described herein, the global SCN 28 and the local SCN 34 are configured to communicatively couple the various elements. The local SCN 34 is used for control plane communications between network elements 36 and PCEs 16 and Designated Routers within a single administrative domain. The global SCN 28 is introduced as a separate control communications network for communication between more than one planning system 26. This global SCN 28 acts as the communications conduit for Planning Systems to exchange information with (i) each other and with (ii) PCE's and (iii) Designated Routers. The global SCN also acts as the communications conduit for PCEs and/or Designated Routers to exchange information when there are multiple administrative domains, i.e. with (i) each other and with (ii) Planning Systems.

Figure 3A:
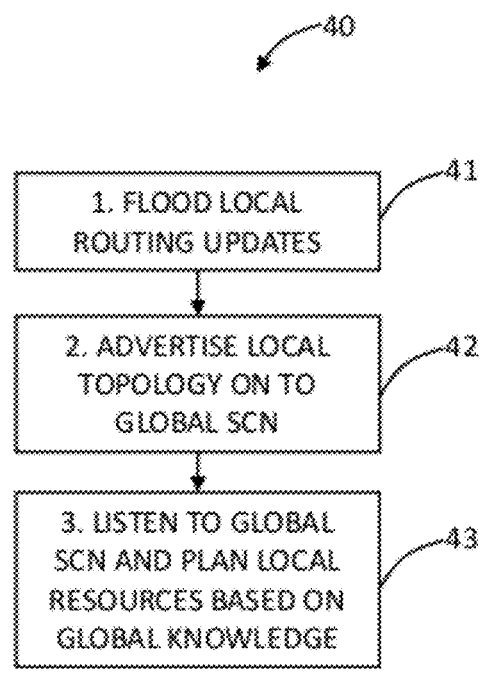
FIGS. 3a and 3b are a flowchart of a topology update method and a diagram illustrates an exemplary operation of the method on the network architecture of FIG. 2.
Figure 3B:
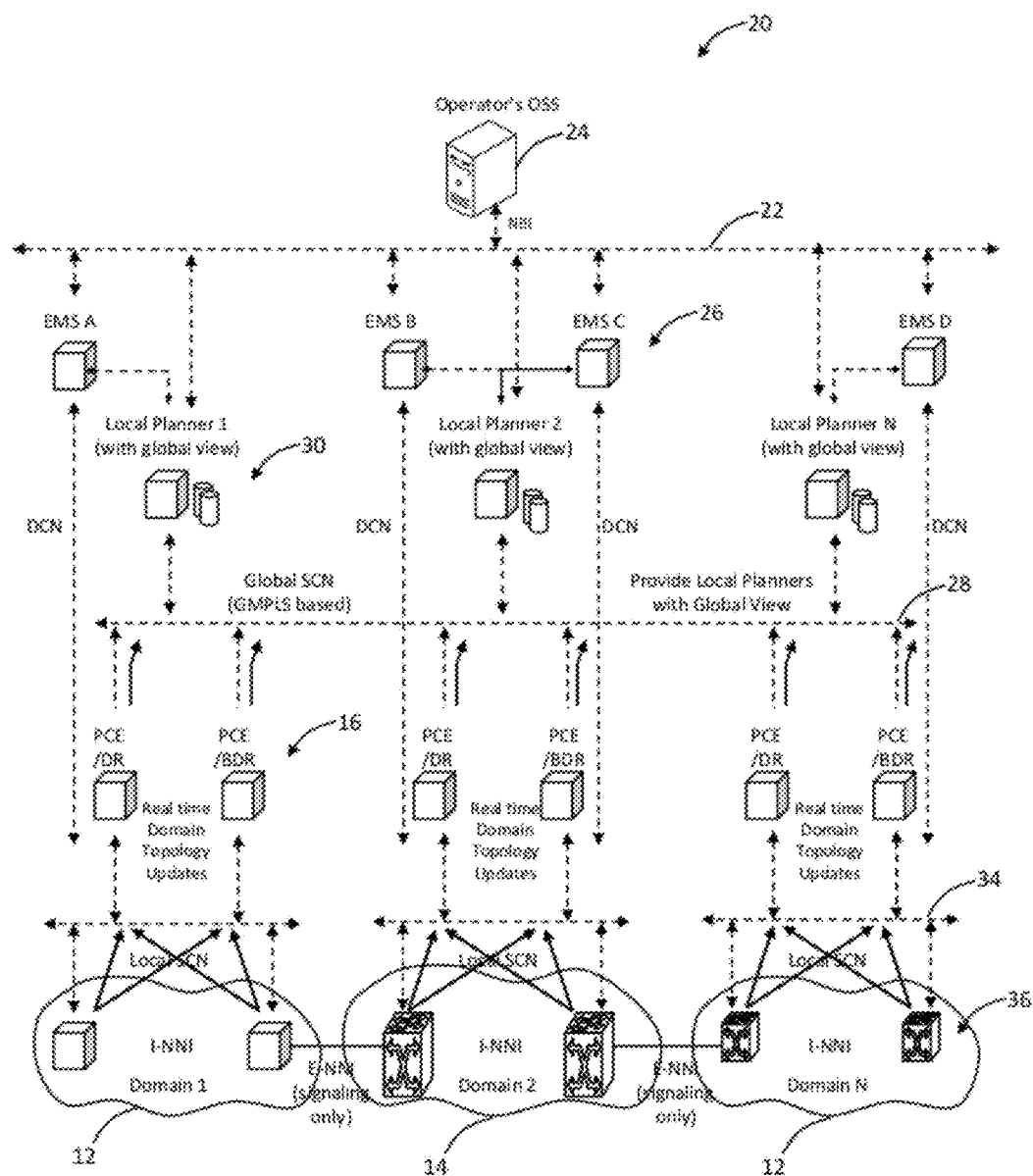

Referring to FIGS. 3a and 3b, in an exemplary embodiment, a flowchart illustrates a topology update method 40 and a diagram illustrates an exemplary operation of the method 40 on the network architecture 20. The topology update method 40 enables the PCEs 16 to update locally and the local planning systems 30 to update globally. Specifically, each of the planning systems 30 needs to have visibility to network wide topology data to enable efficient planning of services. The global information required to plan connections across the whole network includes topology data such as capacity (availability, maximum available), shared risk link/node information, link cost or link latency, for example. Detailed configuration information about each network element is also known by each of the planning systems 30 for its own domain but it is not necessary to share this information globally. The topology update method 40 includes flooding of local routing updates (step 41). Here, the local routing updates are flooded within the domain, i.e. over I-NNI links. The PCE 16 is configured to advertise the local topology updates on the global SCN 28 (step 42). For example, the PCE 16 may be configured to, in addition to standard processing of topology updates, forward all updates onto the SCN 28. The local planning systems 30 are configured to listen on the global SCN 28 for the local routing updates and to plan local resources based on the global knowledge gathered therefrom (step 43). FIG. 3b illustrates the exemplary operation of the method 40 where the step 41 is implemented within the domains 12, 14 and the PCEs 16, the step 42 is implemented between the PCEs 16 and the SCN 28, and the step 43 is implemented between the planning systems 30 and the SCN 28.

Figure 4A:
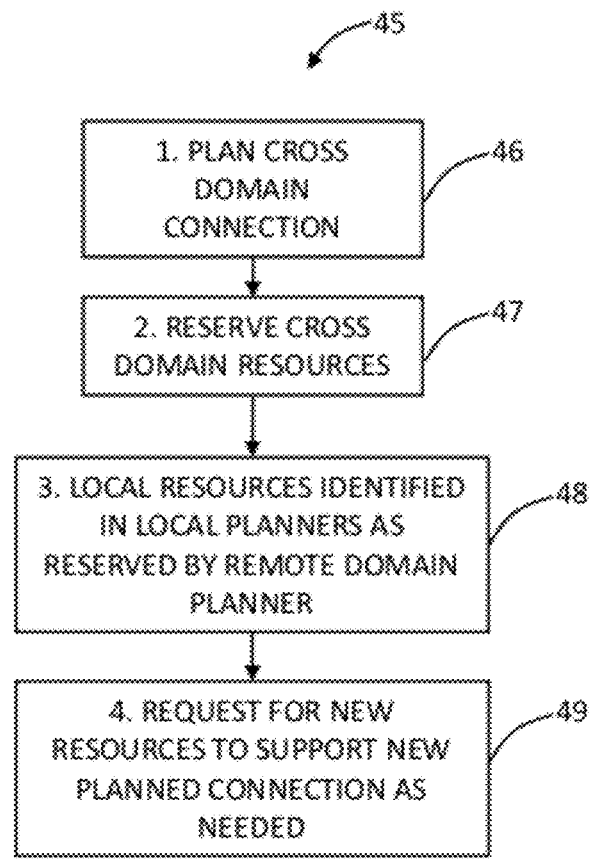
FIGS. 4a and 4b are a flowchart of a end-to-end planning method and a diagram illustrates an exemplary operation of the method on the network architecture of FIG. 2.
Figure 4B:
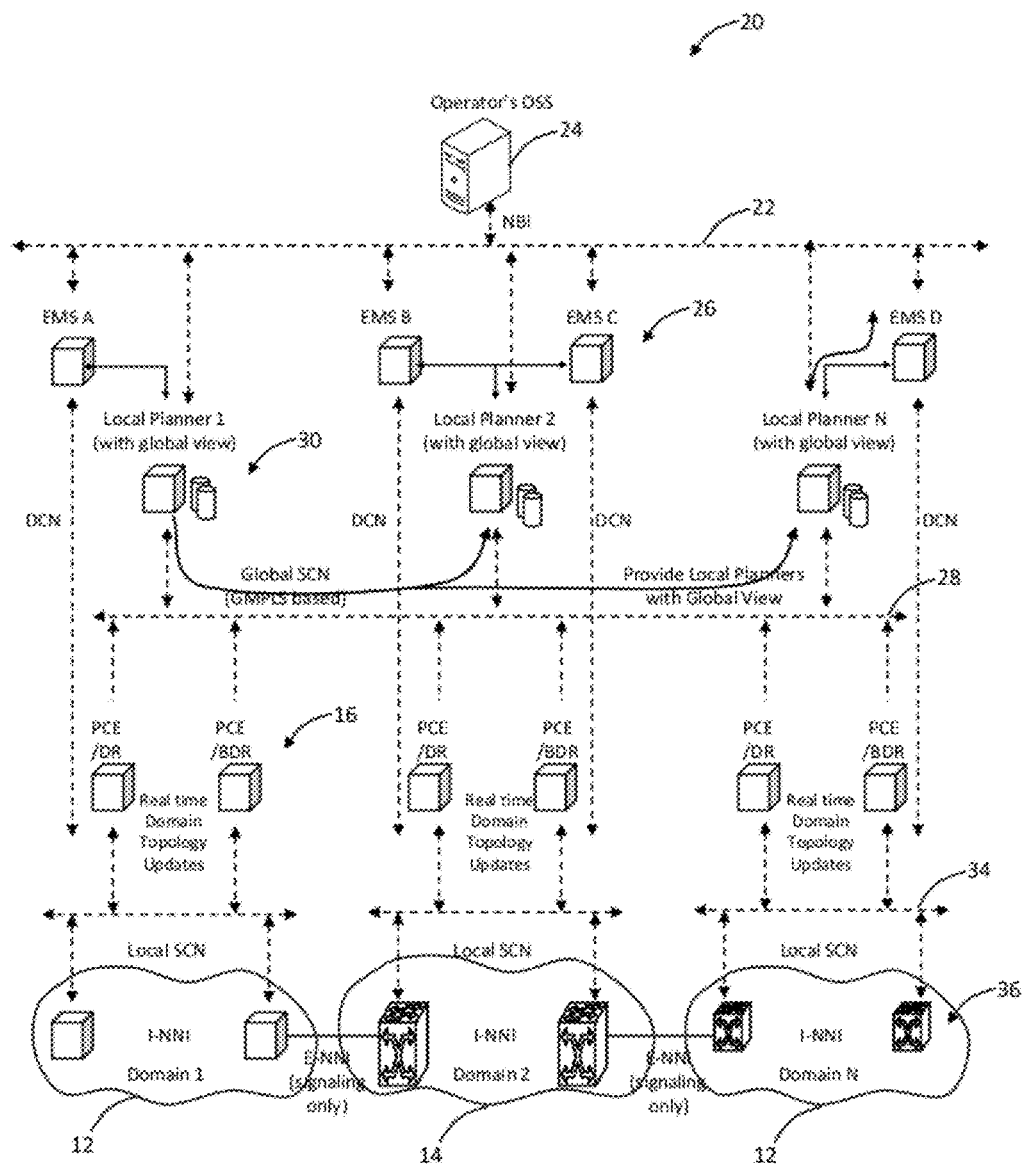

Referring to FIGS. 4a and 4b, in an exemplary embodiment, a flowchart illustrates an end-to-end planning method 45 and a diagram illustrates an exemplary operation of the method 45 on the network architecture 20. To plan a new service, one of the local planning systems 30 computes an end to end route for that service based on user given preferences and network constraints (cost, latency, etc.). When the path is computed, the planning system 30 considers all possible route segments from source to destination. A function of planning process is to define if there is need for additional capacity, and trigger a process that orders and places equipment in right network locations to enable additional capacity. All paths are considered regardless if they have available capacity at the time of planning (or not). The end-to-end planning method 45 includes planning a cross-domain connection (step 46). Here, the planning system 30 may receive the appropriate input (A-Z connection, bandwidth, other constraints, etc.). The local planning system 30 may communicate with other planning systems 30 via the SCN 28 to reserve cross-domain resources (step 47). Each of the other planning systems 30 accordingly may identify local resources as reserved by the remote local planning system 30 requester (step 48). Finally, each of the planning systems 30 may request new resources to support the new planned connection as needed (step 49). FIG. 4b illustrates the exemplary operation of the method 45 where the step 46 is implemented at one of the local planning systems 30, the step 47 is implemented amongst the planning systems 30 via the SCN 28, the step 48 is implemented at the other planning systems 30, and the step 49 may be implemented at the planning systems 30, the EMSs 26, and the OSS 24. The planning systems 30 may include a northbound interface (NBI) to the OSS 24 and optionally to the EMSs 26.

When planning across multiple domains, it was previously established that only a local domain planning system understands local equipment configuration detail. It is therefore responsible for determining if capacity needs to be added and identify how long the capacity addition process takes. Therefore, the planning system 30 that is planning a new cross-domain connection will need to announce its intent to create a service through a remote domain to that remote domain's planning system 30. A resource reservation signaling protocol such as GMPLS's Resource Reservation Protocol-Traffic Engineering (RSVP-TE) may be a candidate for this function. Upon validation in the local domain where capacity is being requested, the planned service is either approved or rejected. Approval in a local domain of an external request may trigger an equipment ordering process to add additional capacity to be available in the network at certain time in the future. Once the equipment order is confirmed, the planning system 30 adds newly planned capacity and advertises it to other planning tools.

Figure 5A:
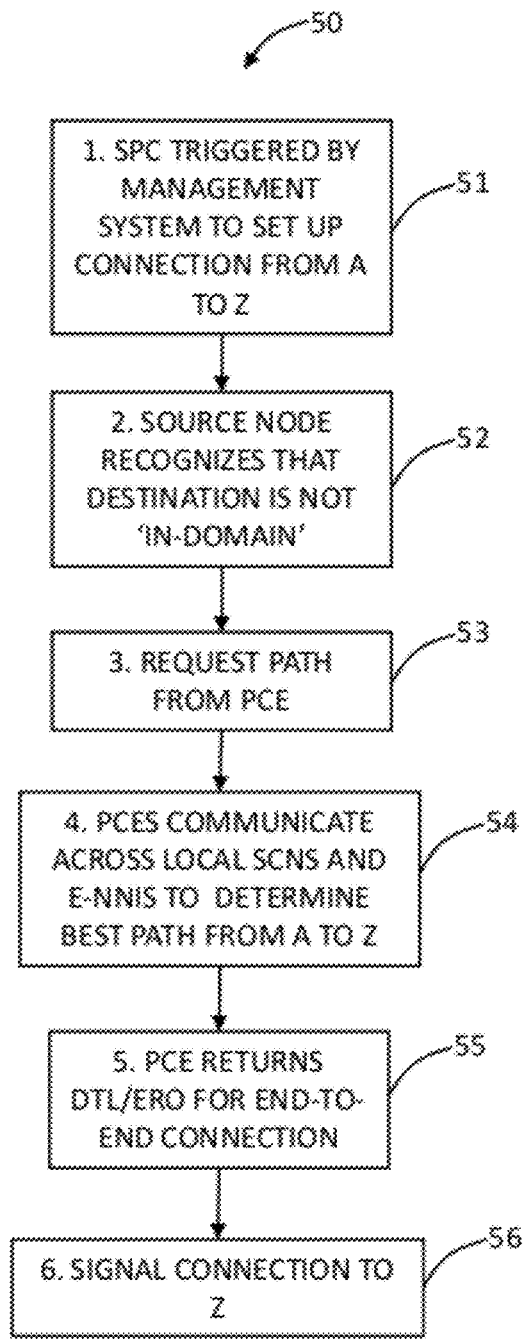
FIGS. 5a and 5b are a flowchart of a end-to-end provisioning method and a diagram illustrates an exemplary operation of the method on the network architecture of FIG. 2.
Figure 5B:
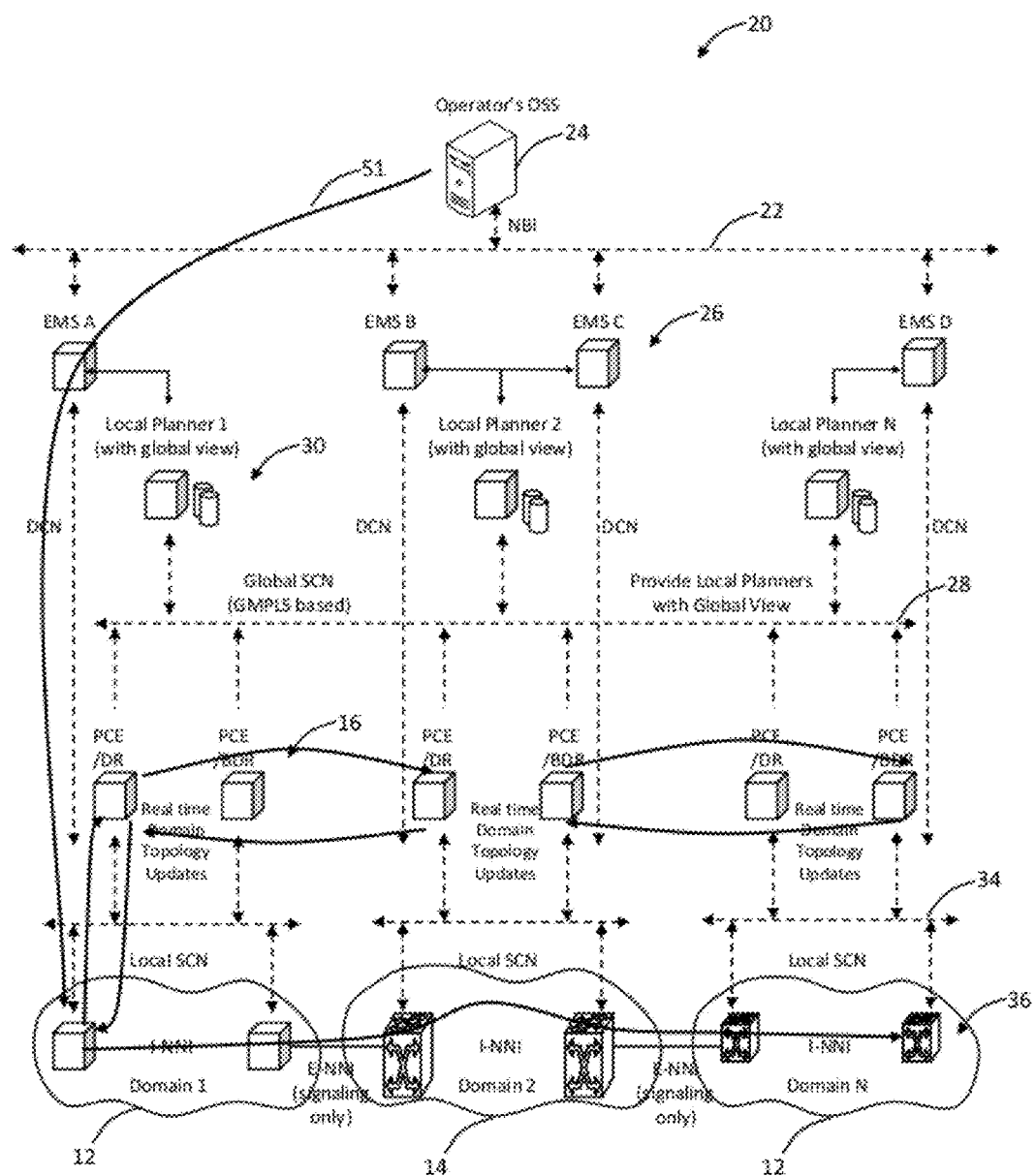

Referring to FIGS. 5a and 5b, in an exemplary embodiment, a flowchart illustrates an end-to-end provisioning method 50 and a diagram illustrates an exemplary operation of the method 50 on the network architecture 20. A soft permanent connection (SPC) is trigged by the management system (e.g., the OSS 24) to set up a connection from A to Z (step 51). The source node recognizes that the destination in not within its domain (step 52). A path is requested from the source node's PCE 16 (step 53). The PCE 16 communicates across the local SCNs 34 to determine the best path from A to Z (step 54). The PCE 16 returns a Designated Transit List (DTL)/Explicit Route Object (ERO) for the end-to-end connection (step 55). The connection is signaled to Z (step 56). FIG. 5*b* illustrates the exemplary operation of the method 50 where the step 51 is performed between the OSS 24 and the source network element 36, the step 52 is performed between the source network element 36 and the PCE 16, the steps 53 and 54 are performed between the PCEs 16, the step 55 is performed between the PCE 16 and the source network element 36, and the step 56 is performed between the network elements 36.

Figure 6:
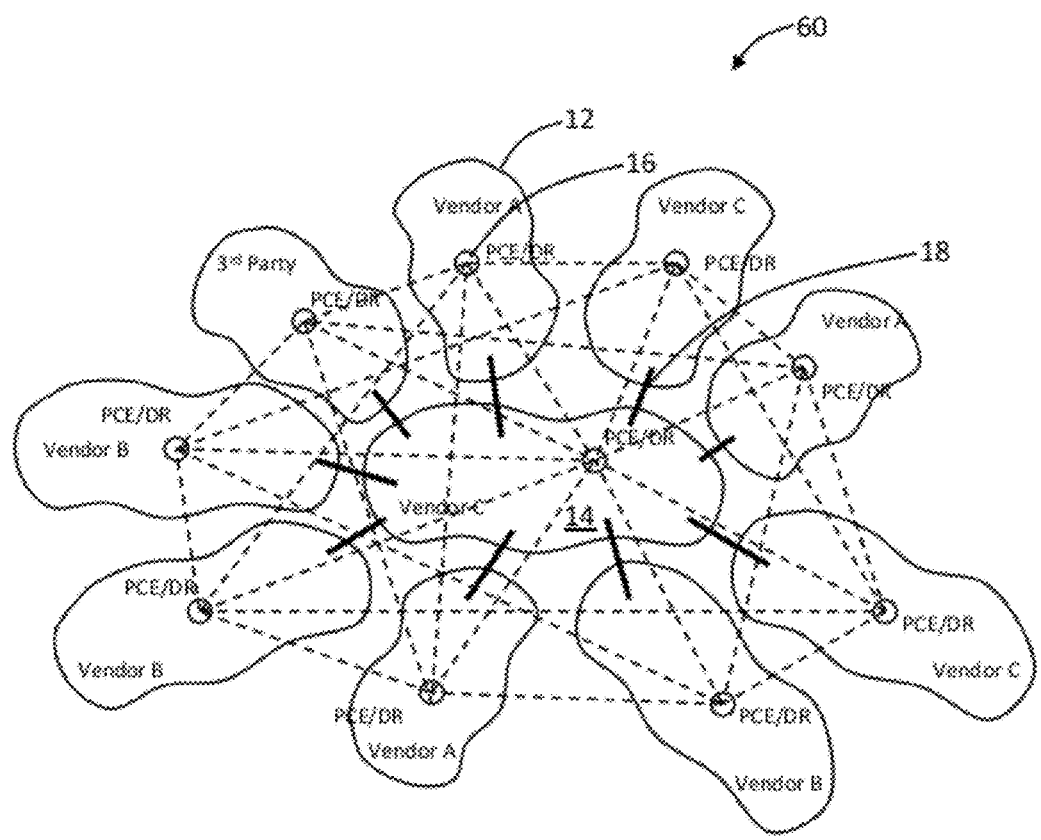
FIG. 6 is a network diagram of another multi-domain control architecture.

Referring to FIG. 6, in another exemplary embodiment, a multi-domain control architecture is illustrated in a network 60. The network 60 is similar to the network 10. However, in the network 60, the PCE 16 in each of the domains 12, 14 understands not only the local topology of its own domain, but also detailed topology of all other domains. To better scale dissemination of data, the PCE 16 in the network 16 uses the concept of a designated router (DR) for the domain 12, 14. After collecting updates from its own domain, the PCE 16 uses multicast, directly or in conjunction with DR/BDR, to send this data to all other PCEs 16. The use of multicast minimizes communication traffic to dispatch the data. In the network 10, each of the PCEs 16 listens to its own domain's routing updates and reflects those on to the global SCN 28. In the network 60, each of the PCEs also uses the global SCN 28 to synchronize its own database with every other PCE 16, thus every PCE 16 achieves full network visibility. In an exemplary embodiment if DR/BDR is not use, the network 10 may include an aggregator that collects local advertisements and multicasts them onto global SCN 28.

Figure 7:
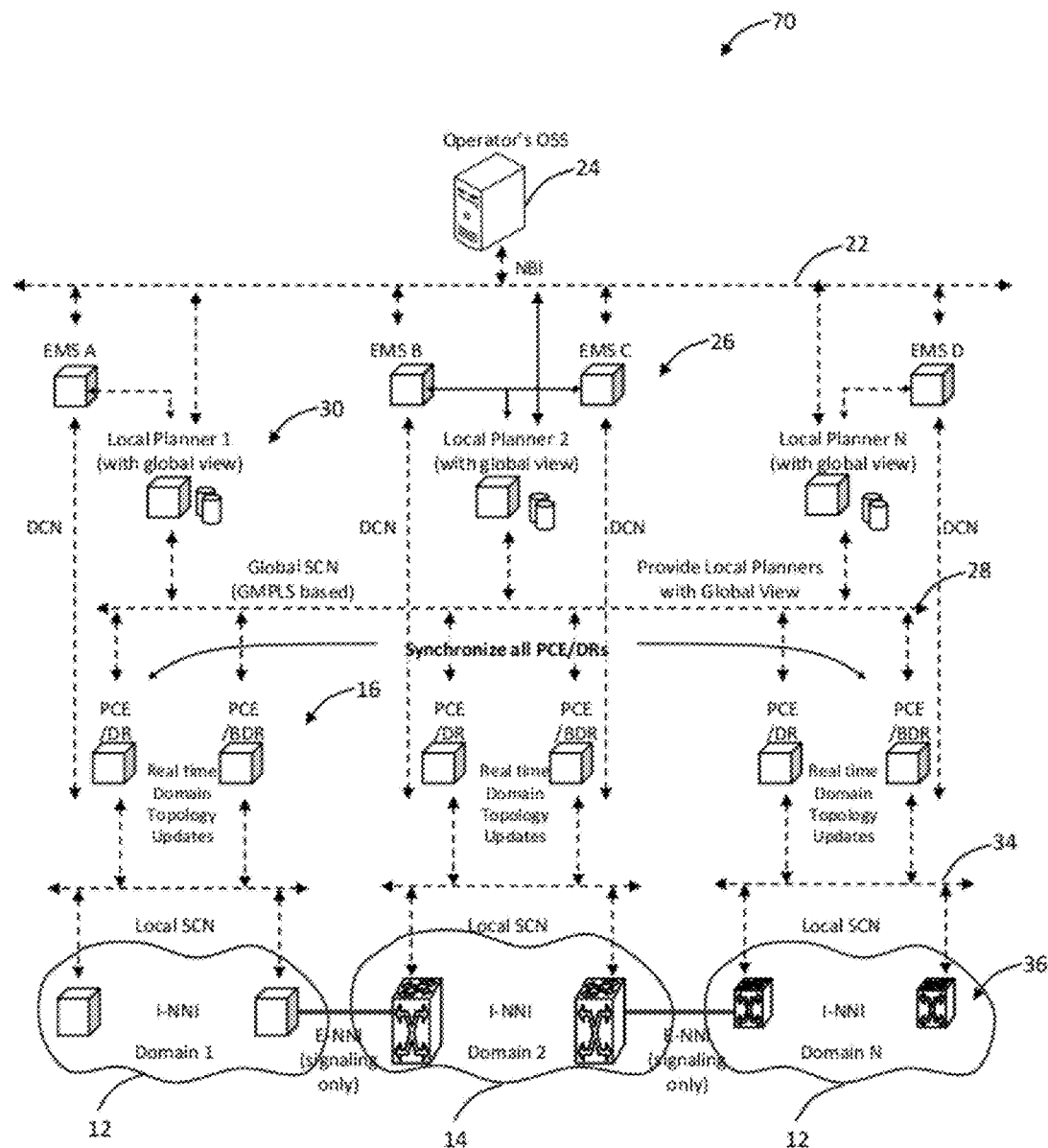
FIG. 7 is a hierarchical diagram of a network architecture for the network of FIG. 2 using the Path Computation Elements (PCEs)/Designated Routers (DR) to maintain real-time topologies of the entire network.

Referring to FIG. 7, in an exemplary embodiment, a network architecture 70 is illustrated for the network 60 of FIG. 6 using the PCEs 16 to maintain real-time topologies across the entire network 60. The network architecture 70 includes various communication layers between elements in the network 60 including a network 22 link between an operator's Operational Support System (OSS) 24 (or Network Management System (NMS)) and various Element Management Systems (EMS) 26 and planning systems 30. The network architecture 70 further includes a global signaling communication network (SCN) 28 communicatively coupling local network planning systems 30 and PCEs 16. The PCEs 16 may also include Designated Routers (DR) and Backup DRs (BDR). The network architecture 70 further includes a local SCN 34 for each domain 12, 14 that communicatively couples the PCEs 16 and network elements 36. The planning systems 30 are configured to listen to routing updates on the SCN 28 from all of the PCEs 16 in conjunction with DR/BDR function. Also, the planning systems 30 are configured to signal connection reservations to other planning systems 30 over the SCN 28. The PCEs 16 are configured also to communicate over the SCN 28. Each of the PCEs 16 has full visibility of its local domain and is capable of calculating an end-to-end path from a source network element 36 through communication to determine an end-to-end path. The PCEs 16 may advertise local domain topology updates to the planning systems 30 and synchronize with other PCEs 16 over the SCN 28. Each of the PCE 16 has also visibility to future planned network computed and reserved by each planning tool. Each PCE 16 may consider future planned resource reservations and future available topology when computing path for current services.

Figure 8A:
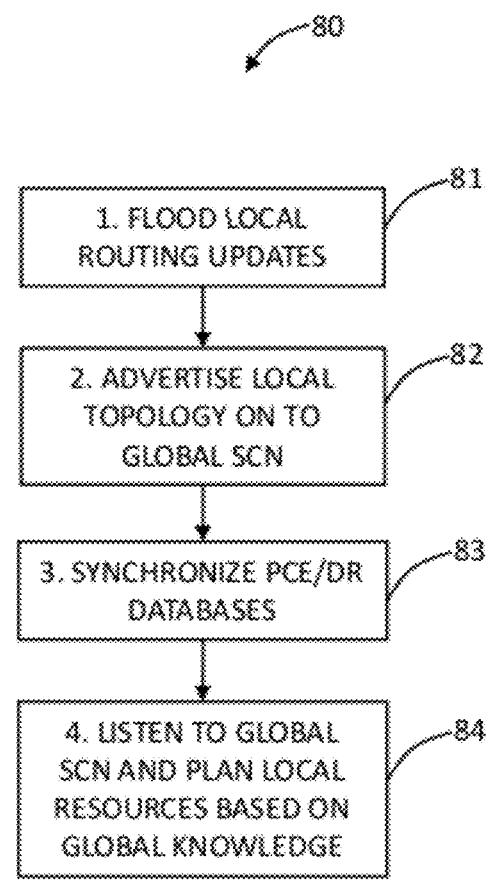
FIGS. 8a and 8b are a flowchart of a topology update method and a diagram illustrates an exemplary operation of the method on the network architecture of FIG. 7.
Figure 8B:
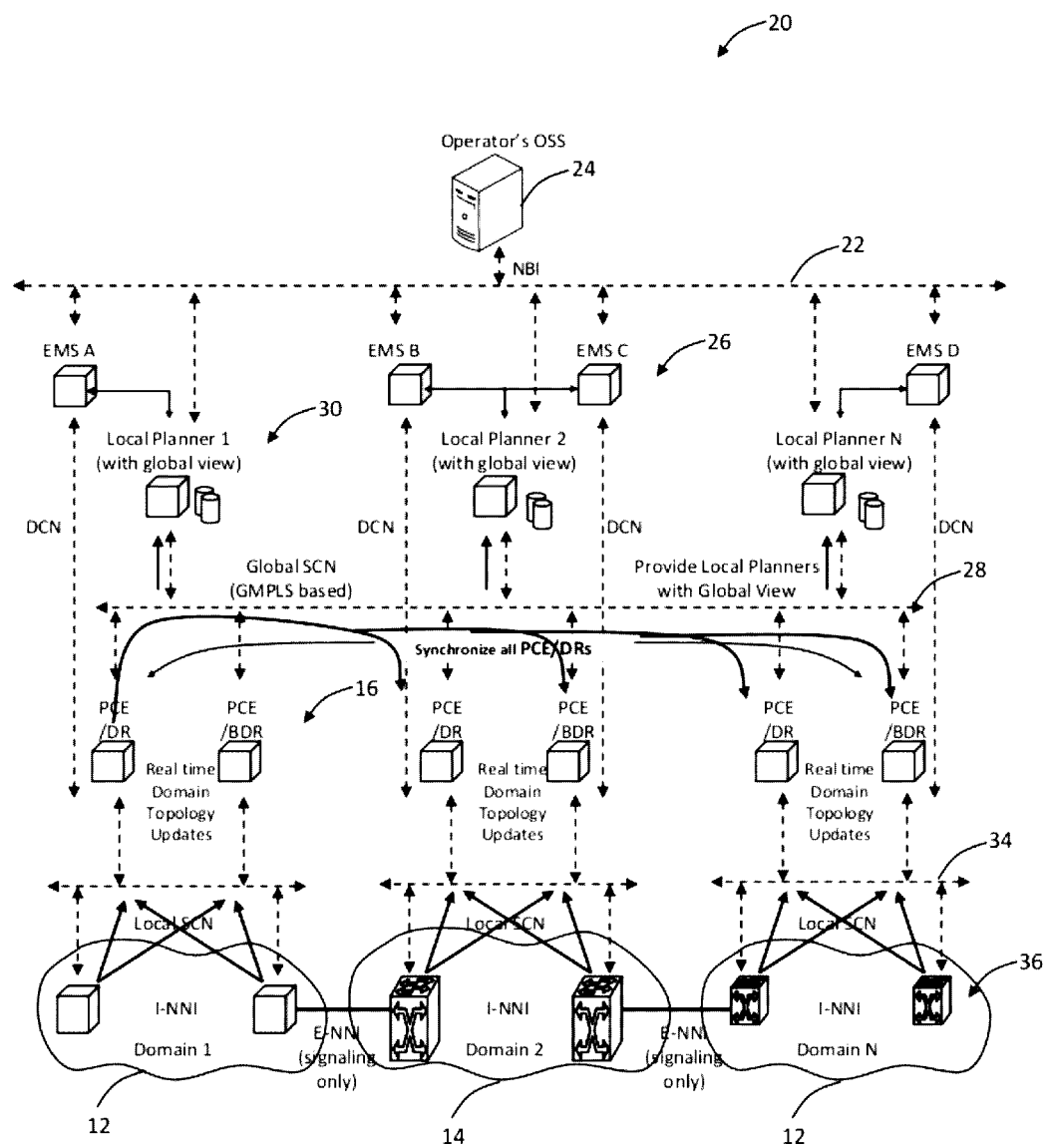

Referring to FIGS. 8*a* and 8*b*, in an exemplary embodiment, a flowchart illustrates a topology update method 80 and a diagram illustrates an exemplary operation of the method 80 on the network architecture 70. The topology update method 80 enables the PCEs 16 to update globally and the local planning systems 30 to update globally. The global information required to plan connections across the whole network includes topology data such as capacity (availability, maximum available), shared risk link/node information, link cost or link latency, for example. The topology update method 80 includes flooding of local routing updates (step 81). Here, the local routing updates are flooded within the domain, i.e. over I-NNI links. The PCE 16 is configured to advertise the local topology updates on the global SCN 28 (step 82). For example, the PCE 16 may be configured to, in addition to standard processing of topology updates, forward all updates onto the SCN 28 by using multicast option. Other PCEs 16 may synchronize their PCE/DR databases based on listening to the SCN 28 (step 83). The local planning systems 30 are configured to listen on the global SCN 28 for the local routing updates and to plan local resources based on the global knowledge gathered therefrom (step 84). FIG. 8*b* illustrates the exemplary operation of the method 80 where the step 81 is implemented within the domains 12, 14 and the PCEs 16, the step 82 is implemented between the PCEs 16 and the SCN 28, the step 83 is implemented at each of the PCEs 16, and the step 84 is implemented between the planning systems 30 and the SCN 28.

Figure 9A:
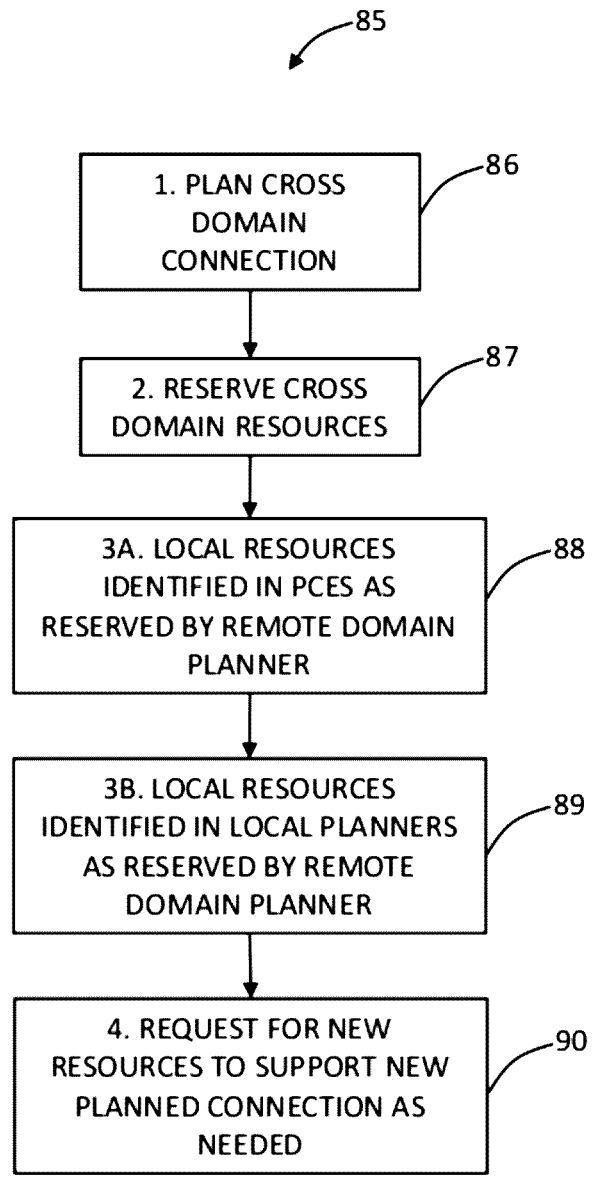
FIGS. 9a and 9b are a flowchart of a end-to-end planning method and a diagram illustrates an exemplary operation of the method on the network architecture of FIG. 7.
Figure 9B:
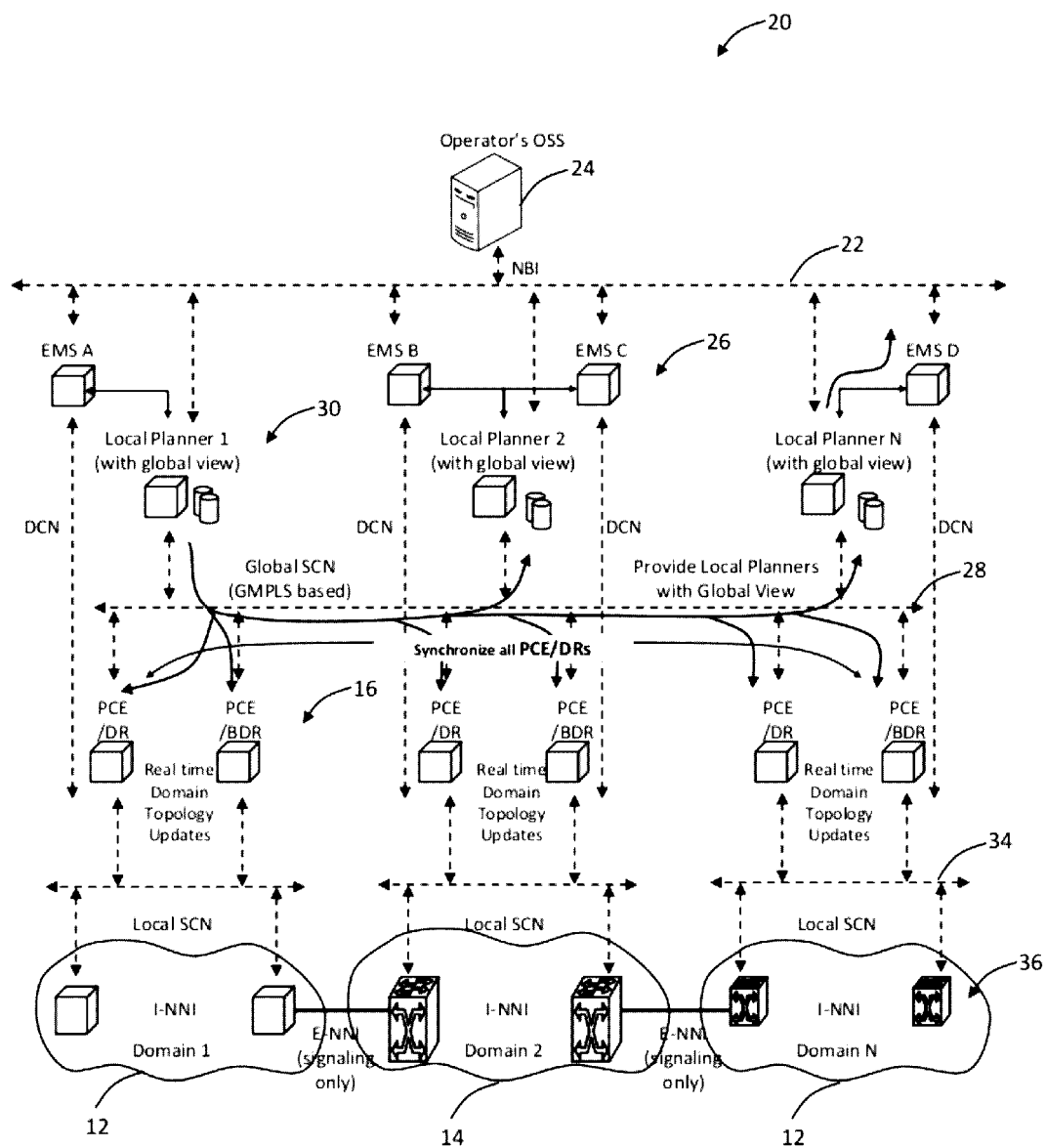

Referring to FIGS. 9*a* and 9*b*, in an exemplary embodiment, a flowchart illustrates an end-to-end planning method 85 and a diagram illustrates an exemplary operation of the method 85 on the network architecture 70. To plan a new service, one of the local planning systems 30 computes an end to end route for that service based on user given preferences and network constraints (cost, latency, etc.). When the path is computed, the planning system 30 considers all possible route segments from source to destination. A function of planning process is to define if there is need for additional capacity, and trigger a process that orders and places equipment in right network locations to enable additional capacity. All paths are considered regardless if they have available capacity at the time of planning (or not). The end-to-end planning method 85 includes planning a cross-domain connection (step 86). Here, the planning system 30 may receive the appropriate input (A-Z connection, bandwidth, other constraints, etc.). The local planning system 30 may communicate with other planning systems 30 via the SCN 28 to reserve cross-domain resources (step 87). Once planning system 30 allocates reserved resources, it may advertize information about reserved resources to each local PCE 16 via the global signaling communication network. Each of the other PCEs 16 accordingly may identify local resources as reserved by the remote local planning system 30 requester and associate reserved resources to specific network services (step 88). Each of the other planning systems 30 accordingly may identify local resources as reserved by the remote local planning system 30 requester (step 89). Finally, each of the planning systems 30 may request new resources to support the new planned connection as needed (step 90). FIG. 9*b* illustrates the exemplary operation of the method 85 where the step 86 is implemented at one of the local planning systems 30, the step 87 is implemented amongst the planning systems 30 via the SCN 28, the step 88 is implemented between the PCEs 16 and various network elements, the step 89 is implemented at the other planning systems 30, and the step 90 may be implemented between the planning systems 30, the EMSs 26, the OSS 24, and various network elements.

Figure 10A:
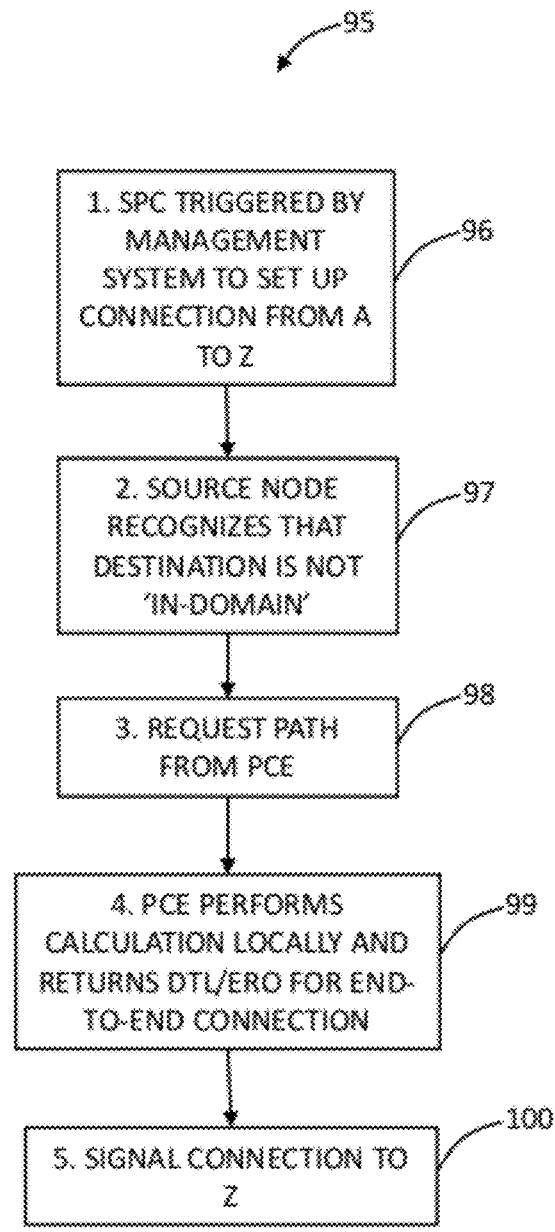
FIGS. 10a and 10b are a flowchart of a end-to-end provisioning method and a diagram illustrates an exemplary operation of the method on the network architecture of FIG. 7.
Figure 10B:
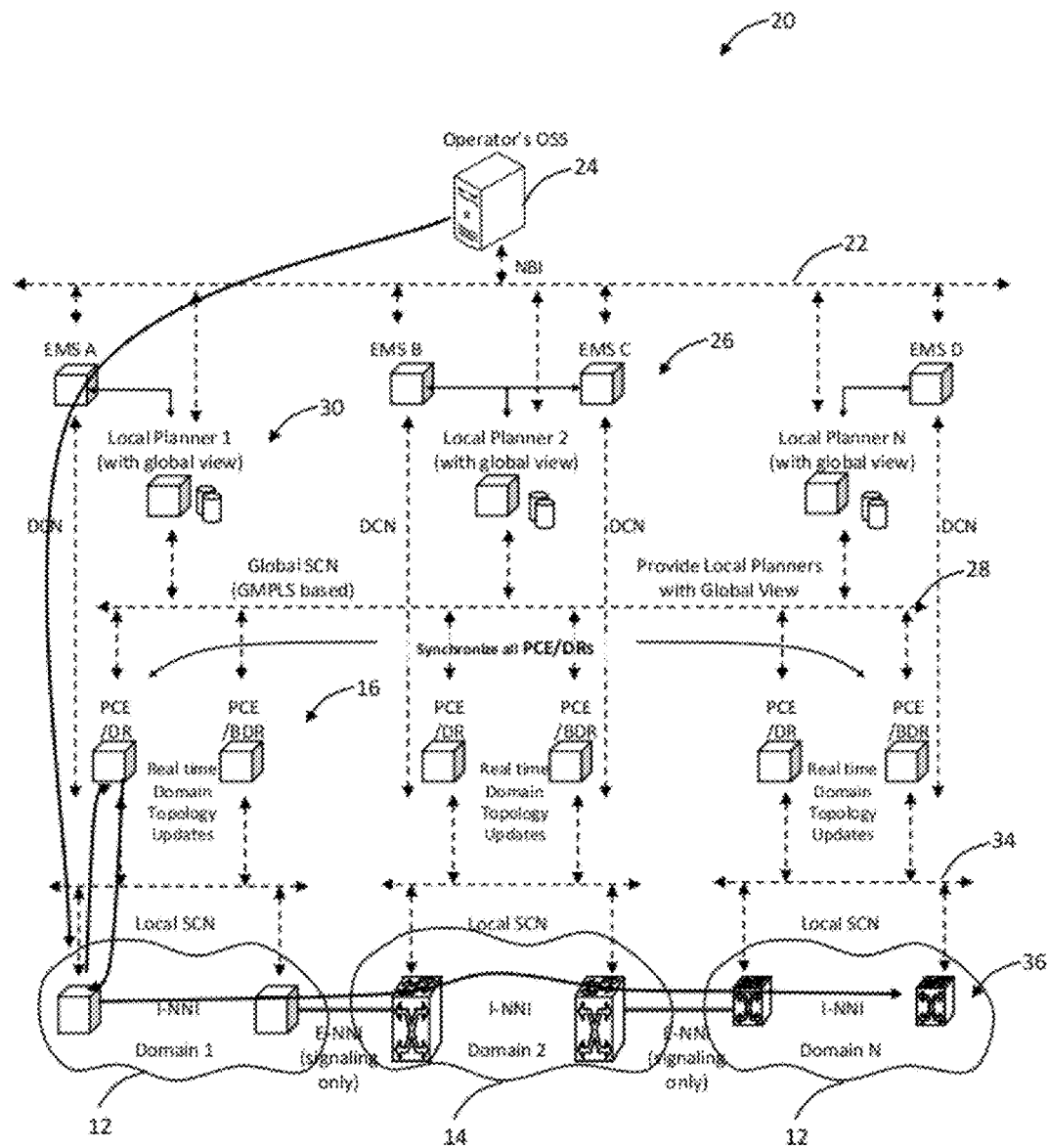

Referring to FIGS. 10*a* and 10*b*, in an exemplary embodiment, a flowchart illustrates an end-to-end provisioning method 90 and a diagram illustrates an exemplary operation of the method 90 on the network architecture 70. A soft permanent connection (SPC) is trigged by the management system (e.g., the OSS 24) to set up a connection from A to Z (step 96). The source node recognizes that the destination in not within its domain (step 97). A path is requested from the source node's PCE 16 (step 98). The PCE performs a calculation locally or in a distributed fashion and returns a Designated Transit List (DTL)/Explicit Route Object (ERO) for the end-to-end connection (step 99). The connection is signaled to Z (step 100). FIG. 10*b* illustrates the exemplary operation of the method 50 where the step 96 is performed between the OSS 24 and the source network element 36, the step 97 is performed between the source network element 36 and the PCE 16, the steps 98 and 98 are performed at the PCE 16 and the network element 36, and the step 100 is performed between the network elements 36.

As highlighted in FIGS. 6-10*b*, information related to the reservation/status of resources may also be distributed to PCEs 16 associated with each domain 12, 14. Thus, any connection request will be made aware of the reservation status of any bandwidth and the timeframe of that reservation. This new knowledge associated with the timing of new planned bandwidth provides increased flexibility to the provisioning process, especially in a dynamic, short hold time service environment. For example, new "short duration" services may be turned up and torn down using reserved bandwidth before the reserved bandwidth needs to be activated. Also, there may be time information in the reservation.

Each planning system 30 now has visibility not only what resources are available in the network right now, but also has visibility to future additional available bandwidth. For example, capacity may be advertised as (a) In use [RED], (b) Reserved by Planning [AMBER] or (c) Available [GREEN]. When a new service is approved in each domain planning system 30, the new service becomes committed and accounted for using bandwidth in that domain. The user of the planning system now has complete visibility of not only existing network services, but also future services that are planned to be provisioned in this network. Each planning system 30 may share this information with local PCE 16 via the systems and methods described herein. Each PCE 16 in turn shares this information therebetween.

Planning of a network typically requires simulation of network failures and allocation of bandwidth to service protection and restoration. Since the planning system has visibility to the entire network topology, the system can run algorithms to compute requirements for additional bandwidth to support its services across the entire network. Upon completion of such a simulation, the user commits a request to allocate additional network bandwidth via signaling to other domains that need to provide additional bandwidth. Once the request is approved, each domain planning system starts the process to add this bandwidth into its domain and advertise additional planned bandwidth to all planning systems. Once equipment is installed in the network, the planned bandwidth is now available to be used. Northbound interface from the planning to the service provider OSS is extensively used during the planning phase.

Figure 11:
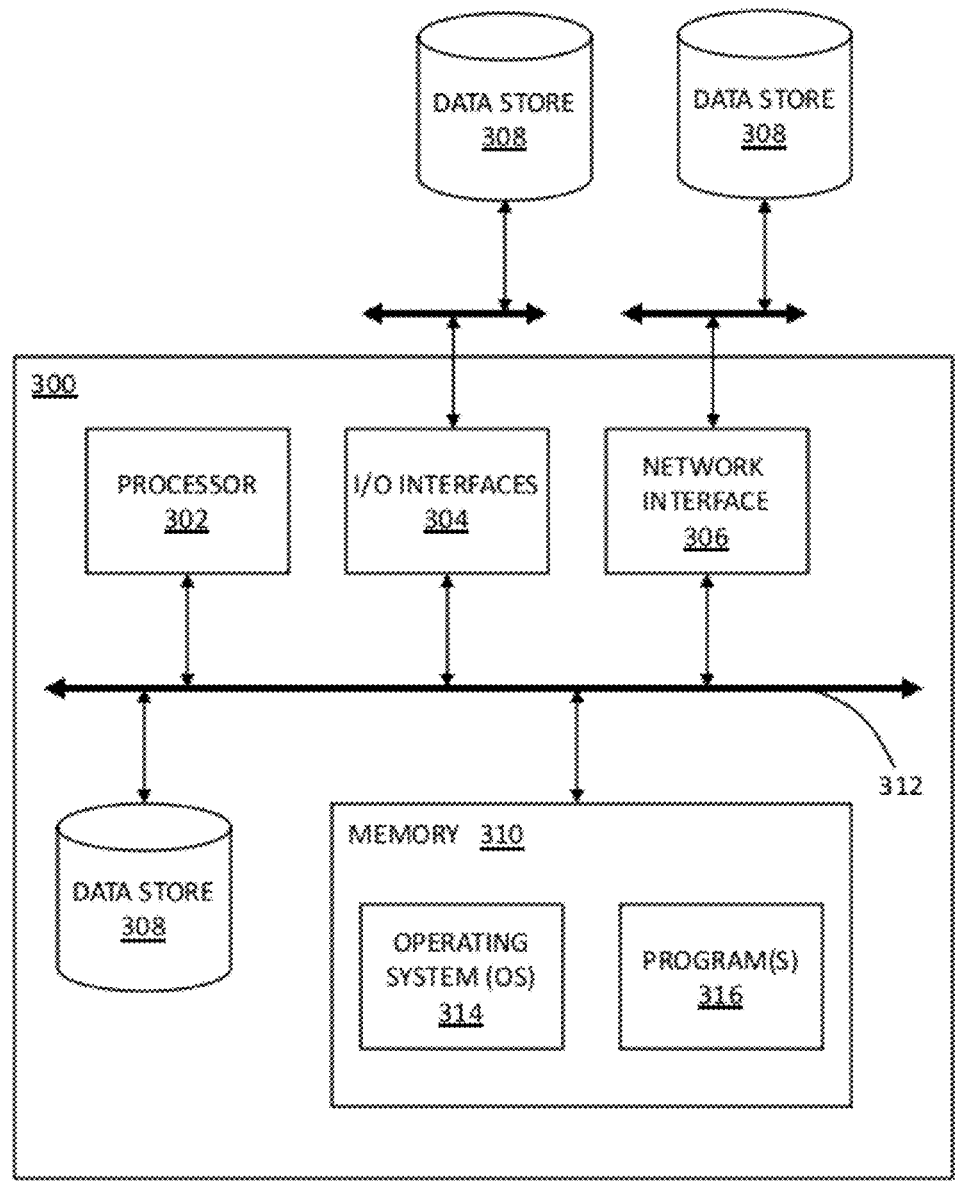
FIG. 11 is a block diagram of a server which may be used in the networks of FIGS. 1 and 6 and/or the network architectures of FIGS. 2 and 7 described herein.

Referring to FIG. 11, in an exemplary embodiment, a block diagram illustrates a server 300 which may be used in the network 10, 60 and/or the network architectures 20, 70 described herein. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 11 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 316 may be configured to implement the various processes, algorithms, methods, techniques, etc. described herein. For example, the server 300 may be used to implement any of the OSS 24, the EMSs 26, the local planning systems 30, and the PCEs 16. The PCEs 16 may also be a device disposed within one of the network elements 36, and may include a similar architecture as the server 300.

Figure 12:
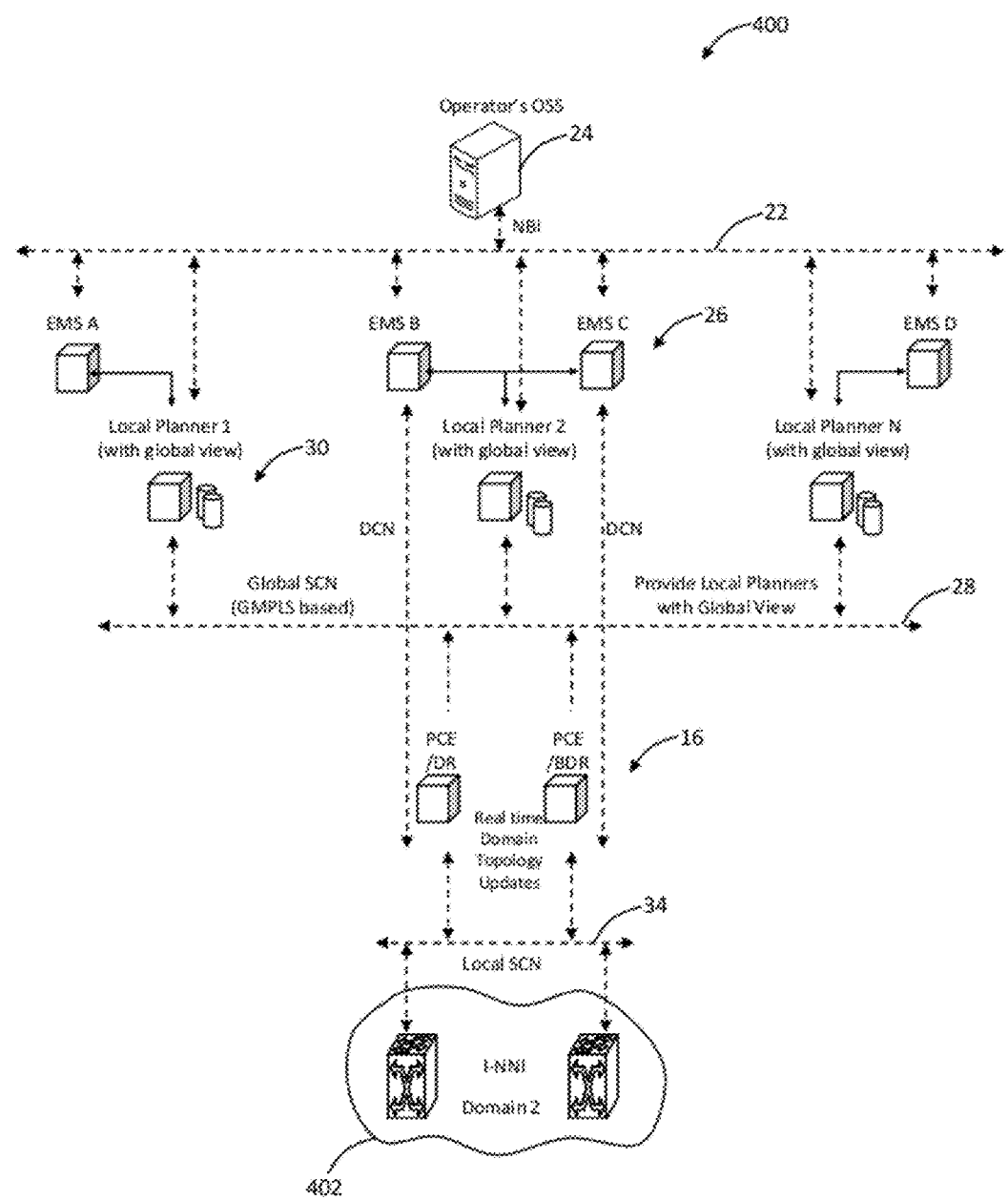
FIG. 12 is a hierarchical diagram of a network architecture for a single domain network using the Path Computation Elements (PCEs) to maintain real-time topologies in the network.

Referring to FIG. 12, in an exemplary embodiment, a network architecture 400 is illustrated for a single domain network 402 using the PCEs 16. The network architecture 400 includes various communication layers between elements in the network 402 including a network 22 link between an operator's Operational Support System (OSS) 24 (or Network Management System (NMS)) and various Element Management Systems (EMS) 26. The network architecture 400 further includes a global signaling communication network (SCN) 28 communicatively coupling local network planning systems 30 and PCEs 16. The PCEs 16 may also include Designated Routers (DR) and Backup DRs (BDR). The network architecture 400 further includes a local SCN 34 for each domain 12, 14 that communicatively couples the PCEs 16 and network elements 36. In contrast to the various other network architectures described herein, the network architecture 400 utilizes a single domain in the network 402. The network architecture 400 includes multiple local network planning systems 30, but could include a single system 30 in some exemplary embodiments. As those of ordinary skill in the art will appreciate, the network architecture 400 may utilize the various methods described herein to couple the local network planning systems 30 to the network elements 36 via the SCNs 28, 34.

Although the network planning systems and methods have been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the network planning systems and methods and are intended to be covered by the following claims.

What is claimed is:

1. A network, comprising:
a plurality of interconnected network elements;
a distributed control plane configured to operate between the plurality of interconnected network elements; and
at least one planning system comprising a server that includes a processor communicatively coupled to the distributed control plane indirectly via a global signaling communication network, wherein the at least one planning system is configured to receive and process messages related to bandwidth reservation and topology from the distributed control plane through the global signaling communication network, wherein the distributed control plane operates between the plurality of interconnected network elements via a local signaling communication network, and wherein updates related to bandwidth reservation and topology received by a path computation element (PCE) or a designated router (DR) on the local signaling communication network are provided by the PCE or the DR to the global signaling communication network to provide the updates to the at least one planning system, wherein the at least one planning system and the PCE or the DR are separate from one another in the network.

2. The network of claim 1, wherein the plurality of interconnected network elements are partitioned into multiple domains.

3. The network of claim 1, wherein the plurality of interconnected network elements are organized in a single domain.

4. The network of claim 1, further comprising:
a plurality of additional path computation elements associated with the plurality of interconnected network elements, wherein one of the path computation elements and the plurality of additional path computation elements comprise a designated router for purposes of optimized data exchange on the global signaling communication network.

5. The network of claim 1, wherein the plurality of interconnected network elements are communicatively coupled directly to the at least one planning system via the global signaling communication network.

6. The network of claim 1, wherein the at least one planning system is configured to:
synchronize a local database based on processed messages; and
perform network planning functions utilizing the synchronized local database.

7. The network of claim 6, further comprising:
a second local planning system, and wherein the at least one planning system is further configured to:
communicate with the second local planning system via the global signaling communication network; and
make reservation requests with the second local planning system.

8. The network of claim 6, wherein the at least one planning system is further configured to:
communicate via the signaling communication network to make reservation requests over the distributed control plane to the plurality of interconnected network elements.

9. The network of claim 8, wherein the at least one planning system is further configured to:
send explicit route objects or designated transit lists over the distributed control plane through the global signaling communication network to the plurality of interconnected network elements.

10. A planning system, comprising:
a server, comprising;
a network interface communicatively coupled to a global signaling communication network; and a processor communicatively coupled to the network interface, wherein the processor is configured to
receive messages related to bandwidth reservation and topology indirectly from a distributed control plane associated with a plurality of interconnected network elements over the global signaling communication network, and
perform updates to a local database based on the messages;
wherein the distributed control plane operates between the plurality of interconnected network elements via a local signaling communication network, and wherein updates related to bandwidth reservation and topology received by a path computation element (PCE) or a designated router (DR) on the local signaling communication network are provided by the PCE or the DR to the global signaling communication network to provide the updates to the planning system, wherein the planning system and the PCE or the DR are separate from one another in a network.

11. The planning system of claim 10, wherein the processor is further configured to:
perform network planning functions utilizing the local database.

12. The planning system of claim 11, wherein the processor is further configured to:
communicate with a second planning system via the global signaling communication network, and
make reservation requests with the second planning system.

13. The planning system of claim 11, wherein the processor is further configured to:
communicate via the global signaling communication network to make reservation requests over the distributed control plane to the plurality of interconnected network elements.

14. The planning system of claim 13, wherein the processor is further configured to:
send explicit route objects or designated transit lists over the distributed control plane via the global signaling communication network to the plurality of interconnected network elements.

15. A method, comprising:
operating a plurality of interconnected network elements with a distributed control plane there between;
signaling control plane messages related to bandwidth reservation and topology from the distributed control plane to at least one local network planning system comprising a server that includes a processor; and
synchronizing a local database of the at least one local network planning system responsive to received control plane messages;
wherein the distributed control plane operates between the plurality of interconnected network elements via a local signaling communication network, and wherein updates related to bandwidth reservation and topology received by a path computation element (PCE) or a designated router (DR) on the local signaling communication network are provided by the PCE or the DR to a global signaling communication network to provide the updates to the at least one local network planning system, wherein the at least one local network planning system and the PCE or the DR are separate from one another in a network.

16. The method of claim 15, further comprising:
performing network planning via the at least one local network planning system; and
based on the network planning, sending a reservation request.

17. The method of claim 16, wherein the reservation request is sent to any of another local network planning system, a network management system, a path computation element, a designated router, and one or more of the plurality of interconnected network elements.

18. The method of claim 16, further comprising:
partitioning the plurality of network elements into a plurality of domains;
interconnecting the distributed control plane from each of the plurality of domains via a signaling communication network; and
communicating all of the plurality of domains to the at least one local network planning system via the global signaling communication network.

* * * * *